US010436238B2

(12) United States Patent
Falkenstein et al.

(10) Patent No.: US 10,436,238 B2
(45) Date of Patent: Oct. 8, 2019

(54) SCREW TYPE FASTENER (71) Applicant: THE HILLMAN GROUP, INC., Cincinnati, OH (US)

(72) Inventors: Michael K. Falkenstein, Oakville (CA); Farhad Lajewardi, Toronto (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 153 days.

(21) Appl. No.: 15/454,119

(22) Filed: Mar. 9, 2017

(65) Prior Publication Data

US 2017/0284447 A1     Oct. 5, 2017

Related U.S. Application Data

(60) Provisional application No. 62/317,717, filed on Apr. 4, 2016.

(51) Int. Cl.
| | |
|---|---|
| *F16B 35/06* | (2006.01) |
| *F16B 23/00* | (2006.01) |
| *F16B 33/02* | (2006.01) |
| *F16B 25/00* | (2006.01) |
| *F16B 25/10* | (2006.01) |

(52) U.S. Cl.
CPC ............ *F16B 35/06* (2013.01); *F16B 23/003* (2013.01); *F16B 25/0015* (2013.01); *F16B 25/0047* (2013.01); *F16B 25/0052* (2013.01); *F16B 25/0057* (2013.01); *F16B 25/0084* (2013.01); *F16B 25/106* (2013.01); *F16B 33/02* (2013.01); *F16B 35/065* (2013.01)

(58) Field of Classification Search
CPC ................ F16B 23/003; F16B 25/0047; F16B 25/0052; F16B 25/0057; F16B 25/0084; F16B 25/10; F16B 25/103; F16B 25/106; F16B 33/002; F16B 33/02; F16B 35/06; F16B 35/065
USPC ....................................... 411/386, 387.2, 411
See application file for complete search history.

(56) References Cited

U.S. PATENT DOCUMENTS

| | | |
|---|---|---|
| 1,151,861 A | 8/1915 | Brumback |
| 3,136,205 A | 6/1964 | Ansingh |
| 3,246,556 A | 4/1966 | Phipard, Jr. |
| 3,903,784 A | 9/1975 | Dekker |
| 4,323,326 A | 4/1982 | Okada et al. |
| 4,655,661 A | 4/1987 | Brandt |
| 4,697,969 A | 10/1987 | Sparkes |
| 5,249,882 A | 10/1993 | Nagoshi et al. |
| 5,516,248 A * | 5/1996 | DeHaitre ............ F16B 23/0015 411/387.2 |
| 5,683,217 A | 11/1997 | Walther et al. |
| 5,722,376 A | 3/1998 | Sweeten |
| 5,827,030 A | 10/1998 | Dicke |
| 5,897,280 A | 4/1999 | Dicke |
| 6,015,252 A | 1/2000 | Lin |
| 6,106,208 A | 8/2000 | Lin |
| 6,152,666 A | 11/2000 | Walther et al. |
| 6,250,866 B1 | 6/2001 | Devine |
| 6,332,741 B1 | 12/2001 | Janusz |
| 6,394,725 B1 | 5/2002 | Dicke |

(Continued)

*Primary Examiner* — Roberta S Delisle
(74) *Attorney, Agent, or Firm* — Thompson Hine LLP (57) ABSTRACT

A screw includes at least one helical thread with a peripheral edge having notched regions spaced apart by notch-free regions. An underside of a head of the screw includes projecting nibs.

24 Claims, 10 Drawing Sheets

(56) References Cited

U.S. PATENT DOCUMENTS

| | | | |
|---|---|---|---|
| 6,402,448 B1 | 6/2002 | Dicke | |
| 6,428,259 B1 | 8/2002 | Yu | |
| 6,616,391 B1 * | 9/2003 | Druschel | F16B 25/0015 411/187 |
| 6,666,638 B2 | 12/2003 | Craven | |
| 6,698,987 B1 | 3/2004 | Dicke | |
| 6,699,421 B2 | 3/2004 | Shimizu et al. | |
| 6,789,989 B2 | 9/2004 | Walther | |
| 6,789,991 B2 | 9/2004 | Hsu | |
| 6,926,484 B2 * | 8/2005 | Kram | F16B 25/0031 411/311 |
| 6,941,635 B2 | 9/2005 | Craven | |
| 6,966,737 B2 | 11/2005 | McGovern et al. | |
| 7,037,059 B2 | 5/2006 | Dicke | |
| 7,101,133 B2 | 9/2006 | Dicke | |
| 7,118,317 B2 | 10/2006 | Hofschneider | |
| 7,255,523 B2 | 8/2007 | Laan | |
| 7,293,947 B2 | 11/2007 | Craven | |
| 7,334,976 B2 | 2/2008 | Dicke | |
| 7,399,150 B2 | 7/2008 | Hofschneider | |
| 7,604,445 B1 | 10/2009 | Dicke | |
| 7,677,854 B2 | 3/2010 | Langewiesche | |
| 7,682,119 B2 | 3/2010 | Chen | |
| 7,682,182 B2 | 3/2010 | Kondo et al. | |
| 7,695,228 B2 | 4/2010 | Craven | |
| 7,699,569 B2 | 4/2010 | Su | |
| 7,785,055 B2 | 8/2010 | Dicke et al. | |
| 7,862,279 B2 | 1/2011 | Stiebitz et al. | |
| 7,862,280 B2 | 1/2011 | Su | |
| 7,988,396 B2 | 8/2011 | Weiss et al. | |
| 8,104,248 B2 | 1/2012 | Gillis et al. | |
| 8,137,042 B2 | 3/2012 | Severns | |
| 8,348,571 B2 | 1/2013 | Shih | |
| 8,348,575 B2 | 1/2013 | Walther | |
| 8,360,702 B2 * | 1/2013 | Yu | F16B 25/0015 411/386 |
| 8,382,414 B2 | 2/2013 | Vandenberg | |
| 8,408,855 B2 | 4/2013 | Stiebitz et al. | |
| 8,430,618 B2 | 4/2013 | Baer | |
| 8,480,342 B2 | 7/2013 | Stiebitz et al. | |
| 8,511,958 B2 | 8/2013 | Chang | |
| 8,591,159 B2 | 11/2013 | Walther | |
| 8,740,531 B2 | 6/2014 | Su et al. | |
| 8,858,145 B2 | 10/2014 | Su et al. | |
| 8,864,430 B2 | 10/2014 | Su | |
| 8,864,431 B2 | 10/2014 | Su et al. | |
| 8,944,734 B2 | 2/2015 | Su | |
| 9,145,911 B2 | 9/2015 | Shih | |
| 9,163,654 B2 | 10/2015 | Barenski, Jr. et al. | |
| 9,377,045 B2 * | 6/2016 | Su | F16B 25/103 |
| 9,822,810 B2 * | 11/2017 | Su | F16B 25/0052 |
| 9,856,901 B2 * | 1/2018 | Dill | F16B 35/065 |
| 2001/0038781 A1 | 11/2001 | Mallet et al. | |
| 2007/0036632 A1 | 2/2007 | Lin | |
| 2007/0237606 A1 * | 10/2007 | Takasaki | F16B 25/0015 411/387.2 |
| 2007/0269287 A1 * | 11/2007 | Runge | F16B 25/00 411/378 |
| 2008/0031705 A1 | 2/2008 | Severns | |
| 2010/0158634 A1 | 6/2010 | Walther | |
| 2011/0064540 A1 | 3/2011 | Walther | |
| 2012/0186067 A1 | 7/2012 | Walther | |
| 2012/0207564 A1 | 8/2012 | Kochheiser | |
| 2012/0294693 A1 * | 11/2012 | Gonciarz | F16B 25/0063 411/387.1 |
| 2013/0011214 A1 * | 1/2013 | Lin | F16B 25/0015 411/387.4 |
| 2013/0039720 A1 | 2/2013 | Shih | |
| 2014/0064878 A1 | 3/2014 | Su et al. | |
| 2014/0178150 A1 | 6/2014 | Su et al. | |
| 2014/0294534 A1 * | 10/2014 | Park | F16B 25/0052 411/387.1 |
| 2015/0184685 A1 * | 7/2015 | Su | F16B 25/103 411/387.2 |

* cited by examiner

SCREW TYPE FASTENER

TECHNICAL FIELD

This application relates generally to threaded fasteners, and more particularly, to a threaded wood screw.

BACKGROUND

A typical screw configuration includes an elongated shank that extends between a driving head of the screw and a pointed end of the screw. At least part of the shank is helically threaded. Wood screws with a variety of configurations are known. However, improvements upon self-drilling speed, torque to seat and removal torque are continuously sought.

It would be desirable to provide a cost-effective wood screw configuration that facilitates quick and effective installation.

SUMMARY

In one aspect, a screw includes a head end, a shank and a tapered end. The head end includes a tool engaging part and is located at one end of the shank, while the tapered end is located at an opposite end of the shank. At least one thread is formed along the shank including a primary thread that begins on the tapered end, extends onto the shank and terminates at a set location short of the head end. The primary thread is a right-hand thread having a peripheral edge. At least a first helical portion of the peripheral edge includes a plurality of notch regions spaced apart from each other by respective notch-free regions. Each notch region (i) extends helically through between about two-hundred 280 circumferential degrees and about three-hundred and twenty circumferential degrees and (ii) includes a plurality of spaced notches formed in the peripheral edge, and each notch-free region extends helically through between about forty circumferential degrees and about eighty circumferential degrees and lacks any notches.

In another aspect, a screw includes a head end, a shank and a tapered end. The head end includes a tool engaging part and is located at one end of the shank, while the tapered end is located at an opposite end of the shank. At least one thread is formed along the shank including a primary thread that begins on the tapered end, extends onto the shank and terminates at a set location short of the head end. The primary thread is a right-hand thread having a peripheral edge. At least a first helical portion of the peripheral edge includes a plurality of notch regions spaced apart from each other by respective notch-free regions. Each notch region extends helically and includes a plurality of spaced notches formed in the peripheral edge where a center-to-center circumferential spacing between the notches is no more than about thirty-five circumferential degrees, and each notch-free region extends helically through between at least about forty circumferential degrees.

In another aspect, a screw includes a head end, a shank and a tapered end. The head end includes a tool engaging part and located at one end of the shank, while the tapered end is located at an opposite end of the shank. At least one helical thread is formed along the shank. The head end includes a first frustoconical part tapering in a direction from the tool engaging part toward the shank at a first angle relative to an axis of the screw, and a second frustoconical part tapering from the first frustoconical part to the shank at a second angle relative to the axis. At least the first frustoconical part includes a plurality of outwardly protruding spaced apart nibs, each nib having a first end toward the tool engaging part and extending toward the shank to a second end. Each nib has opposite sides and a joining surface that is a segment of a common frustoconical shape. The frustoconical shape defines a third angle relative to the axis, where the third angle is less than the first angle but greater than the second angle.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 20 is an enlarged view of the head end of a screw showing an alternative nib arrangement.

DETAILED DESCRIPTION

Referring to FIGS. 1-12, one embodiment of a screw 10 is shown. The screw includes a head end 12, a shank 14 and a tapered end 16. The head end 12 includes a tool engaging part 18 (e.g., in the form of a drive receiving recess) and is located at one end of the shank 14, and the tapered end 16 is located at an opposite end of the shank 14 and terminates in a point 20. By way of example, the taper angle α1 defining the point 20 may be between about nineteen and about twenty-eight degrees (such as about twenty to twenty-five degrees, such as about twenty-one to twenty-three degrees). This angle range provides a good start for initial penetration into wood material when driving the screw. Multiple threads are formed along the screw, as discussed below.

Figures 1, 2, 3, 4:
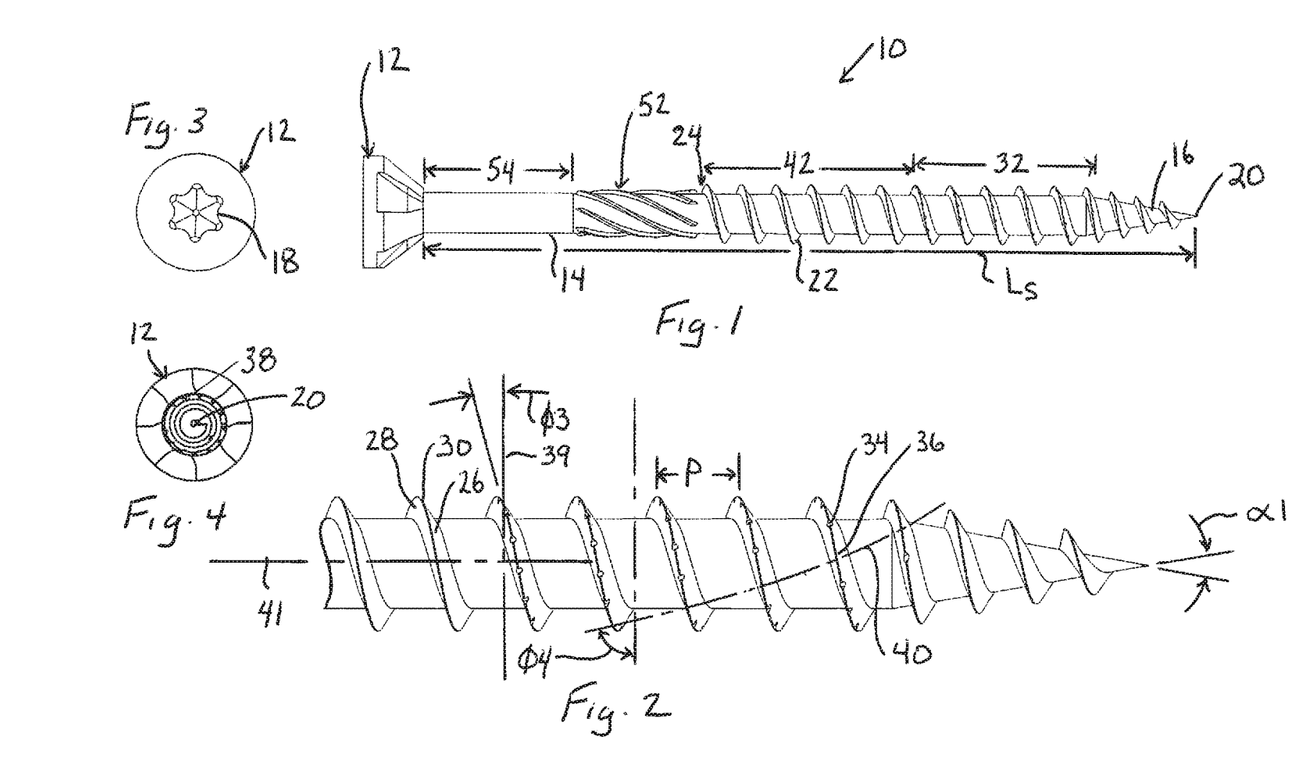
FIG. 1 shows a side elevation of one embodiment of a screw.
FIG. 2 shows an enlarged side elevation of part of the screw of FIG. 1.
FIG. 3 shows a head end view of the screw of FIG. 1.
FIG. 4 shows a point end view of the screw of FIG. 1.
Figure 2D:
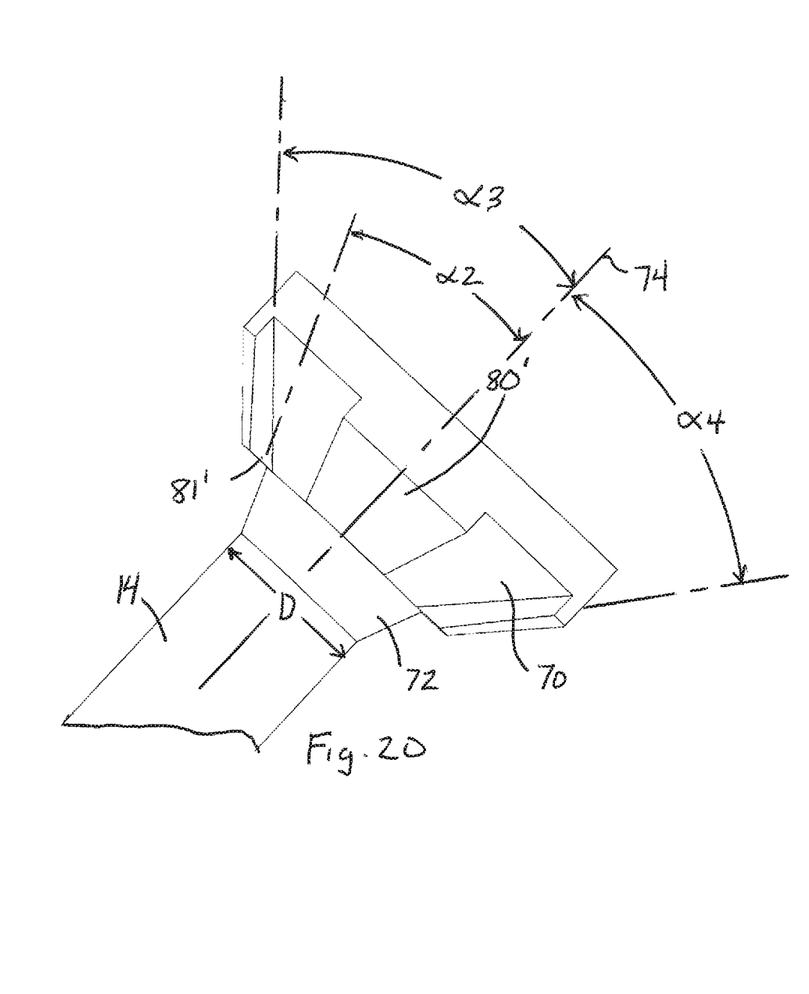
Figure 5:
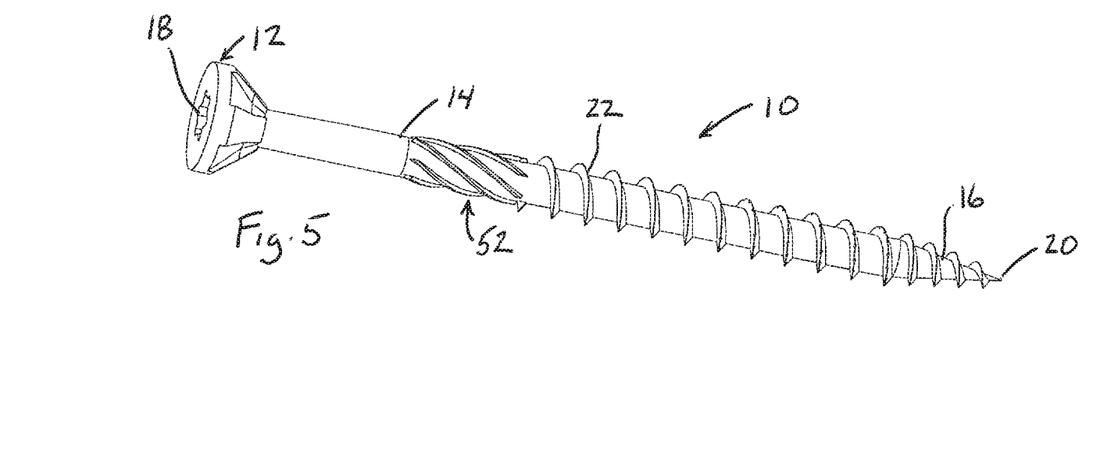
FIG. 5 shows a perspective view of the screw of FIG. 1.
Figure 6:
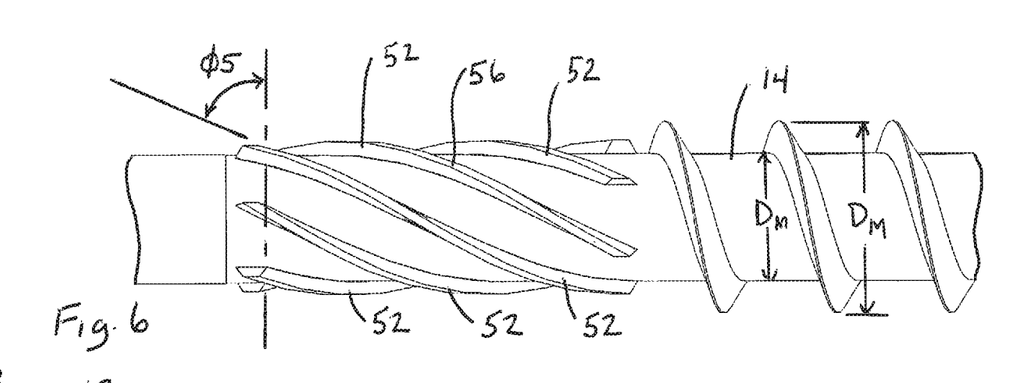
FIG. 6 shows an enlarged side elevation of part of the screw of FIG. 1.
Figure 7:
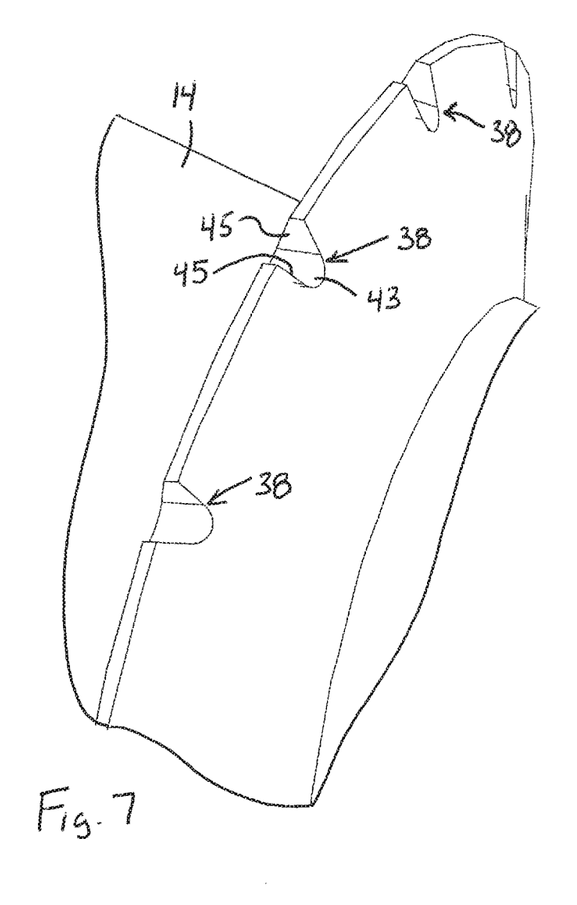
FIG. 7 shows an enlarged perspective view of a thread portion with notches.
Figure 8:
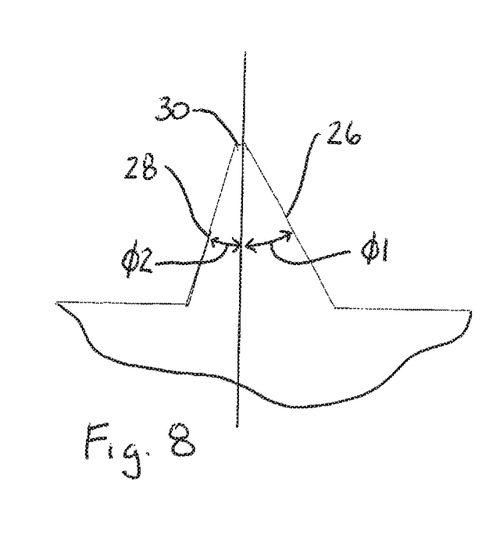
FIG. 8 is a partial cross-section (without cross-hatch) of the primary screw thread.
Figures 9, 10, 11:
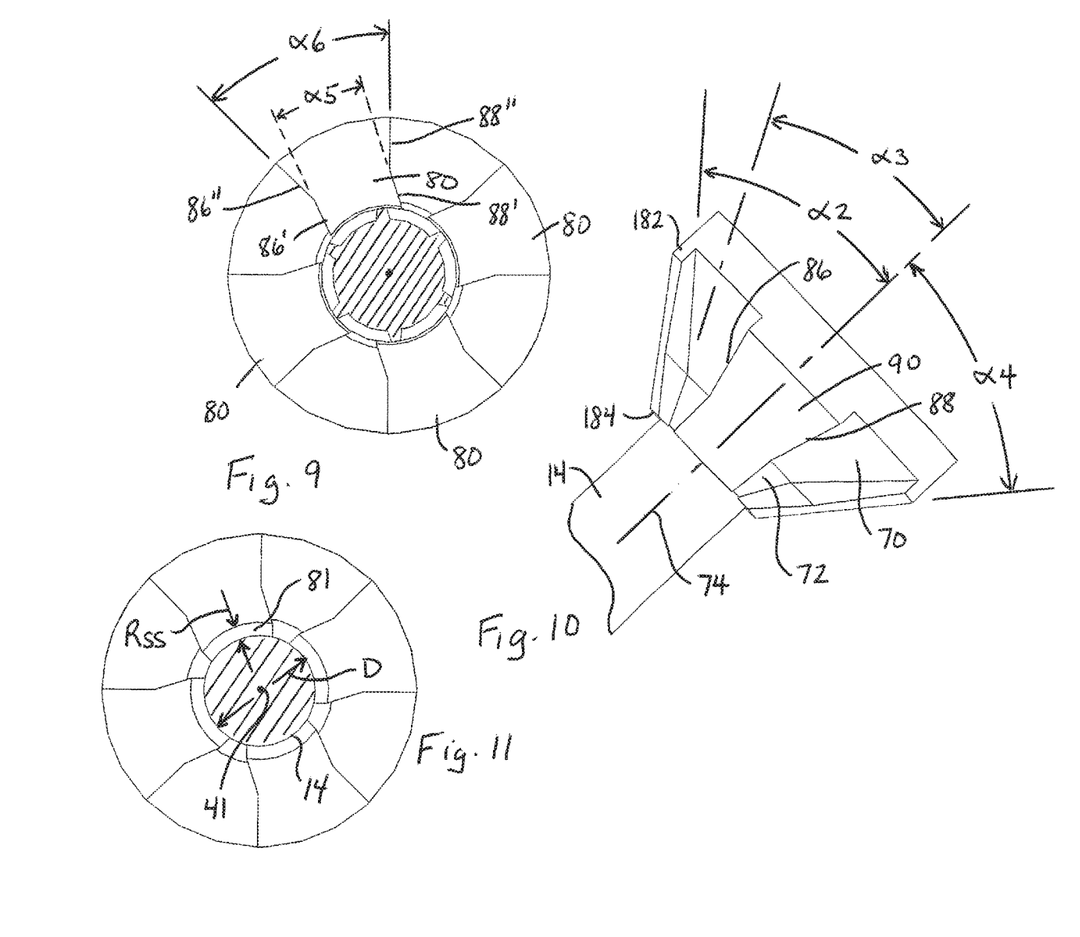
FIG. 9 is a cross-section of the screw taken along a plane normal to the screw axis in the region of the spiral flute threads and looking toward the head end of the screw.
FIG. 10 is an enlarged view of the head end of the screw.
FIG. 11 is a cross-section of the screw taken along a plane normal to the screw axis in the thread free region of the shank and looking toward the head end and nib configuration of the screw.
Figure 12:
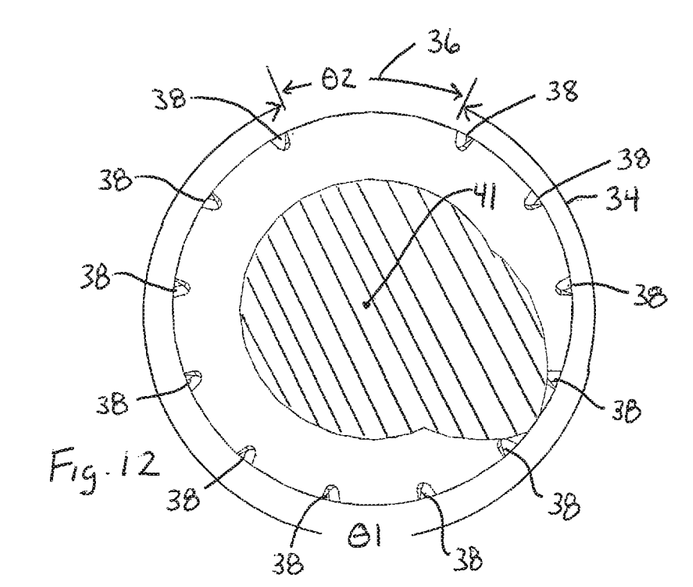
FIG. 12 is a cross-section of the screw taken along a plane normal to the screw in the notched region of the primary screw thread and looking toward the tip end of the screw.

A primary thread 22 begins on the tapered end 16 (e.g., either at the very tip or slightly short of the tip), extends onto the shank 14 and terminates at a set location 24 short of the head end 12. The primary thread 22 is a right-hand thread as shown, and has a peripheral edge 30 formed where a leading flank 26 meets a trailing flank 28. In one implementation, the thread is asymmetric, with a leading flank angle Φ1 in the range of about twenty-five to about thirsty-one degrees and a trailing flank angle Φ2 in the range of about twelve to about nineteen degrees, but variations are possible.

A helical portion or extent 32 of the peripheral edge 30 includes a plurality of notch regions 34 spaced apart from each other by respective notch free regions 36. As best shown in FIG. 4, each notch region 34 extends through a circumferential angle θ1 of between about two-hundred and eighty (280) degrees and about three-hundred and twenty (320) degrees (such as between about 295 degrees and 305 degrees, such as about 300 degrees) and includes a plurality of side-by-side notches 38 formed in the peripheral edge 30 of the thread, where the notches are spaced apart equally from each other. Here, twelve notches 38 are shown in each region 34, but the number could vary, such as more than twelve notches, or having only eleven notches, only ten notches, or less. However, in a desirable arrangement a center-to-center spacing between the notches in each notch region is no more than about thirty-five circumferential degrees.

Figure 21:
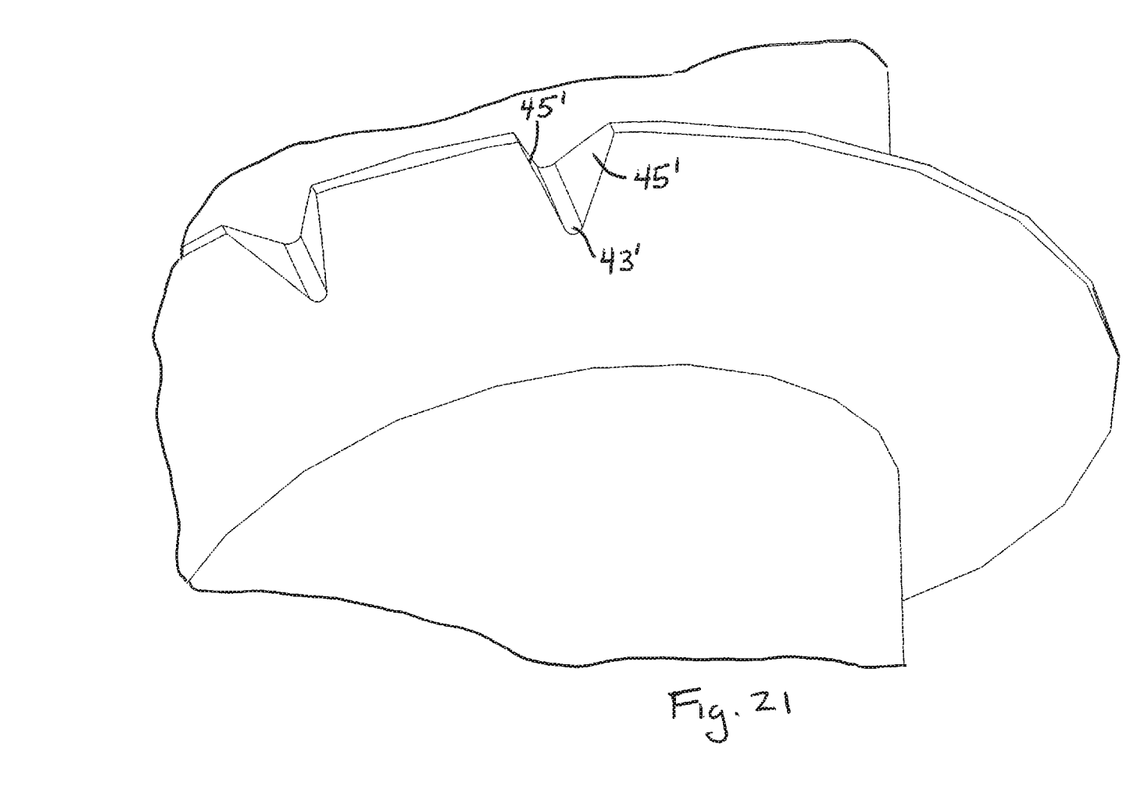
FIG. 21 is an enlarged perspective view of a thread portion with notches having an alternative configuration.

In one example, the notches may be formed as substantially V-shaped notches that are oriented substantially perpendicular to the thread helix angle Φ3 of the primary thread 22, which angle Φ3 may be between about ten degrees and about twenty-five degrees, where the helix angle is the cut angle of the thread relative to a plane 39 perpendicular to the central axis 41 of the thread. In this regard, in the context of the present application the term "V-shaped" as used in relation to thread peripheral edge notches means that the notch is formed as a V-shaped recess or cutout along the peripheral edge, which may have a sharp point at the bottom 43 of the V-shape, a flat at the bottom 43 of the V-shape or a curvature at the bottom 43 of the V-shape. Here, notches with a bottom curvature are shown. The orientation of a V-shaped notch 38 is defined as the direction of a line formed by the base or bottom 43 of the V-shape of the notch (which line runs parallel to the sides 45 of the V-shape of the notch). The term "substantially perpendicular to the helix angle" means oriented at 90 degrees relative to the helix angle, ±5 degrees for tolerance. The V-shaped notches may enhance the cutting action of the primary thread as the screw is rotated into a material. The V-shaped notches may also reduce the resistance and torque to seat the screw. As an exemplary alternative, FIG. 21 shows an alternative configuration of a V-notch in which the base or bottom 43' is more narrow and the sides 45' less steep than in the case of the notches shown in FIG. 7.

Each notch free region 36 extends through a circumferential angle θ2 of between about forty (40) degrees and about eighty (80) degrees (such as between about 55 and 65 degrees, such as about 60 degrees) and lacks any notches (such that the edge 30 is continuous in such regions 36). Notably, the notch free regions 36 are distributed along the helical portion 32 such that a line 40 sequentially traversing a mid-point of each of the V-notch free regions 36 extends in a left-hand helical path about the shank 14 and at a helix angle Φ4, which may be between about eighty (80) degrees and about sixty-five (65) degrees (e.g., 90 degrees minus the angle Φ3).

In the illustrated embodiment, the primary thread 22 includes another helical portion or extent 42 extending from helical portion or extent 32 to the set location 24, where helical portion 42 is completely free of any notches along the peripheral edge. However, in other variations the notch arrangement (i.e., repeating sequence of notch regions 34 and notch-free regions 36) could run substantially the full length of the thread 22 (e.g., encompassing the length of both illustrated extents 32 42, or encompassing at least 80% of the full length of the thread 22, such as 90% or more) or could run from a location on or near the tapered end and substantially to the set location 24.

In one implementation, the primary thread 22 has a pitch P of about 0.090 inches (or in other variations 0.100 or 0.111 inches), a major diameter $D_M$ of between about 0.160 and about 0.165 inches and a minor diameter $D_m$ of between about 0.103 and 0.107 inches. In another implementation, the primary thread has a pitch P of about 0.100 inches, a major diameter $D_M$ of between about 0.175 and about 0.182 inches and a minor diameter $D_m$ of between about 0.114 and about 0.119 inches. In various implementations, a ratio of the major diameter $D_M$ to the pitch P is between about 1.75 and about 1.84, and a ratio of the minor diameter $D_m$ to the pitch P is between about 1.14 and about 1.19.

A set of secondary, right-hand spiral flute threads 52 are located on the shank between the primary thread 22 and the head 12. The flute threads 52 are substantially closer to the primary thread 22 than the head 12 as shown, such that the shank 14 includes an extended and helically continuous thread-free region 54 between the spiral flute threads 52 and the head 12. In one example the thread free region 54 may have an axial length that is between about 25% and about 30% of the head to tip length $L_S$ of the screw, but variations are possible. Each spiral flute thread 52 extends at a helix angle Φ5 (which may be between about fifty-five (55) degrees and about sixty-five (65) degrees, such as about sixty (60) degrees) for a relatively short axial distance such that each spiral flute thread 52 extends circumferentially through less a full 360 degrees. By way of example, each spiral flute thread 52 may extend through between about one-hundred fifty (150) circumferential degrees and about two-hundred ten (210) circumferential degrees (such as about 180 circumferential degrees). Each spiral flute thread 52 may have a opposed flanks extending outward from the shank 14, where the opposed flanks terminate at a crest surface 56 that extends between the opposed flanks. Between four and eight spiral flute threads 52 (such as the illustrated six) may be provided, all within a common axial extent of the shank 14.

The head end 12 includes an underside with frustoconical parts 70 and 72. Frustoconical part 70 tapers from the face in which tool engaging recess is located 18 toward the shank 14 at a neck angle α2 (which may be between about forty-four (44) degrees and about forty-eight (48) degrees, such as between about forty-five (45) and forty-six and one-half (46.5) degrees) relative a central axis 74 of the screw shank. Frustoconical part 72 tapers from the edge of frustoconical part 70 to the shank 14 at a neck angle α3 (which may be between about twenty (20) and about twenty-five (25) degrees), which is less than angle α2.

A plurality of outwardly protruding spaced apart nibs 80 are located at the underside of the head. Here, four nibs 80 are shown, but other variations are possible, such as between three and six nibs. Each nib 80 has one end 82 proximate the face of head end and extends toward the shank 14 to an opposite end 84. In the illustrated embodiment the nib end 84 is located along the line or plane of intersection of the frustoconical part 72 with the shank 14. Each nib 80 has opposite sides 86 and 88 and a joining surface 90 that that may be a segment of frustoconical shape that is common to the set of nibs 80. The frustonical shape tapers from the face of the head end 12 toward the shank 14 at an angle $\alpha 4$ that is less than angle $\alpha 3$ but greater than angle $\alpha 2$ (e.g., angle $\alpha 4$ may be on the order of about thirty-seven (37) to about forty (40) degrees, such as about thirty-eight and one-half (38.5) degrees).

As shown, each nib 80 extends onto the frustoconical part 72 and terminates at an axial location where the frustoconical part 72 meets the shank 14. Each nib 80 defines a radially outward step 81 at this axial location, where a radial dimension $R_{SS}$ of each step 81 is between about fifteen percent (15%) and about thirty percent (30%) of a diameter D of the shank 14 at the axial location. Notably, the opposite sides 86', 88' of each nib diverge from each other at a diverging angle $\alpha 5$ (e.g., between about 0 degrees and about 10 degrees) along frustoconical part 72 when moving from the shank 14 toward frustoconical part 70, and the opposite sides 86", 88" of each nib diverge from each other at another diverging angle $\alpha 6$ (e.g., between about 40 degrees and about 50 degrees, such as about 45 degrees) along the frustoconical part 70 when moving from the frustoconical part 72 toward the face of the head end 12, where diverging angle $\alpha 6$ is greater than the angle $\alpha 5$. The diverging angles mentioned herein are the included angled formed by the opposite sides, or portions of the opposite sides as the case may be.

Figure 13:
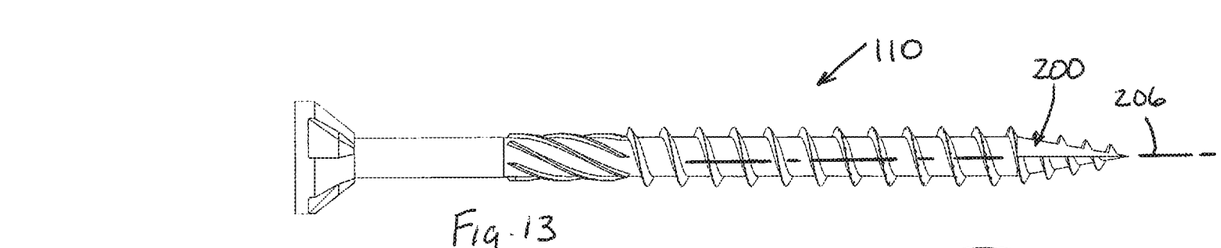
FIGS. 13-15 show an embodiment of a screw incorporating an axial cut (17-cut)
Figure 14:
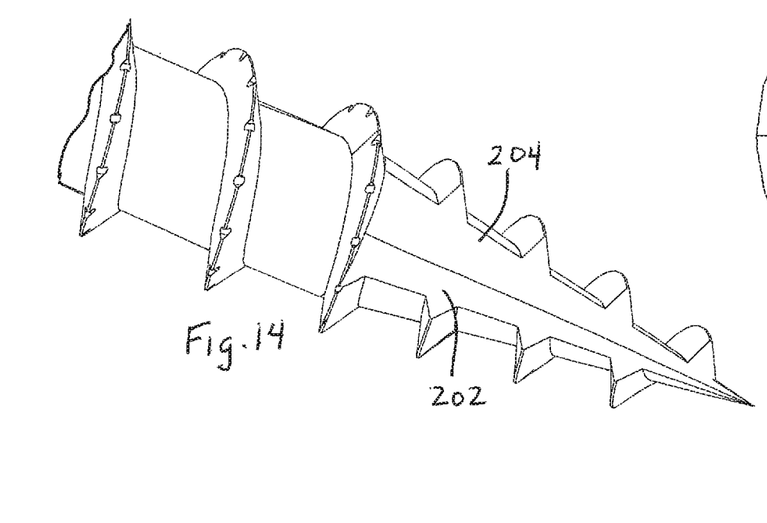
Figure 15:
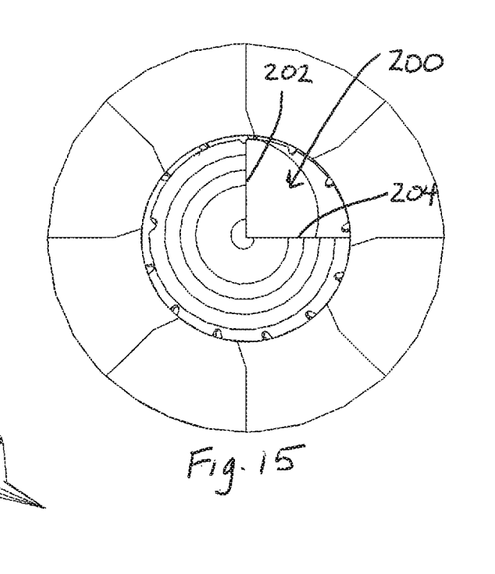

Referring now to FIGS. 13-15, another embodiment of a screw 110 is shown. Screw 110 is similar in all respects to screw 10 described above, except that an axial cut 200 is provided along the tapered end of the screw. The axial cut runs from a center axis of the screw is defined by radially extending sides 202 and 204 that intersect at an included angle of about ninety degrees. The cut 200 therefore runs parallel to the center axis 206 of the screw. Here, the cut 200 runs from the tip of the screw and stops at the location where the tapered end of the screw meets the main shank, but it is recognized that cut could also extend partly along the main shank. The cut 200 creates discontinuities in the primary thread of the screw and provides potential performance benefits, such as quicker & easier penetration, less effort towards driving, pre-cutting prior to driving screw.

Figures 16, 17:
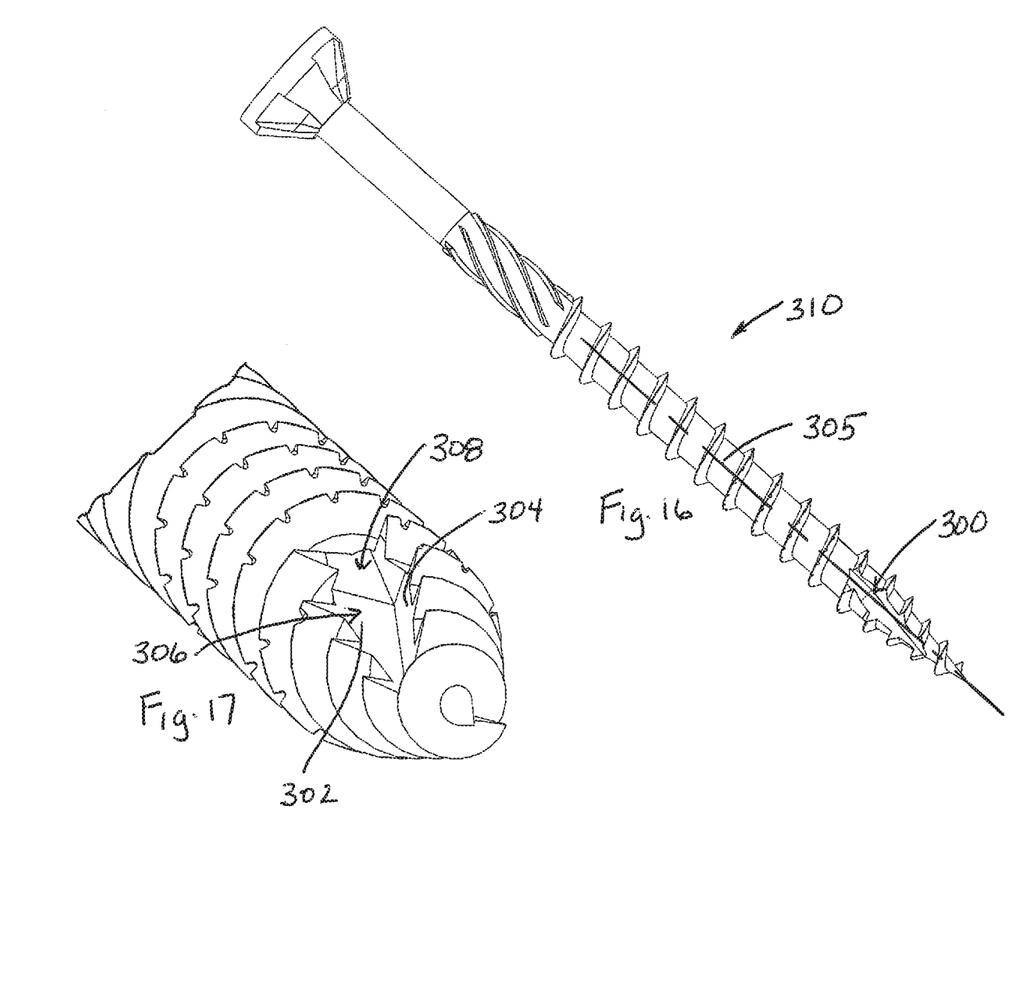
FIGS. 16-17 show an embodiment of a screw incorporating a skewed cut.

FIGS. 16-17 show another embodiment of a screw 310. Screw 310 is similar in all respects to screw 10 described above, except that an axial cut 300 is provided toward the tip end of the screw. The cut 300 is angled or skewed relative to the axis 305 of the screw, begins on the tapered end of the screw spaced from the tip or away from the tip and ends on the main shank of the screw. The cut 300 is defined by sides 302 and 304 that intersect at an included angle of about ninety degrees. Here, the cut includes two distinct skews in regions 306 and 308, where the skew in region 30 (relative to the center axis 305 of the screw) is greater than the skew in region 308 (relative to the center axis 305 of the screw). The cut 300 intersects four revolutions of the primary thread, creating four discontinuities in the primary thread.

Figures 18, 19:
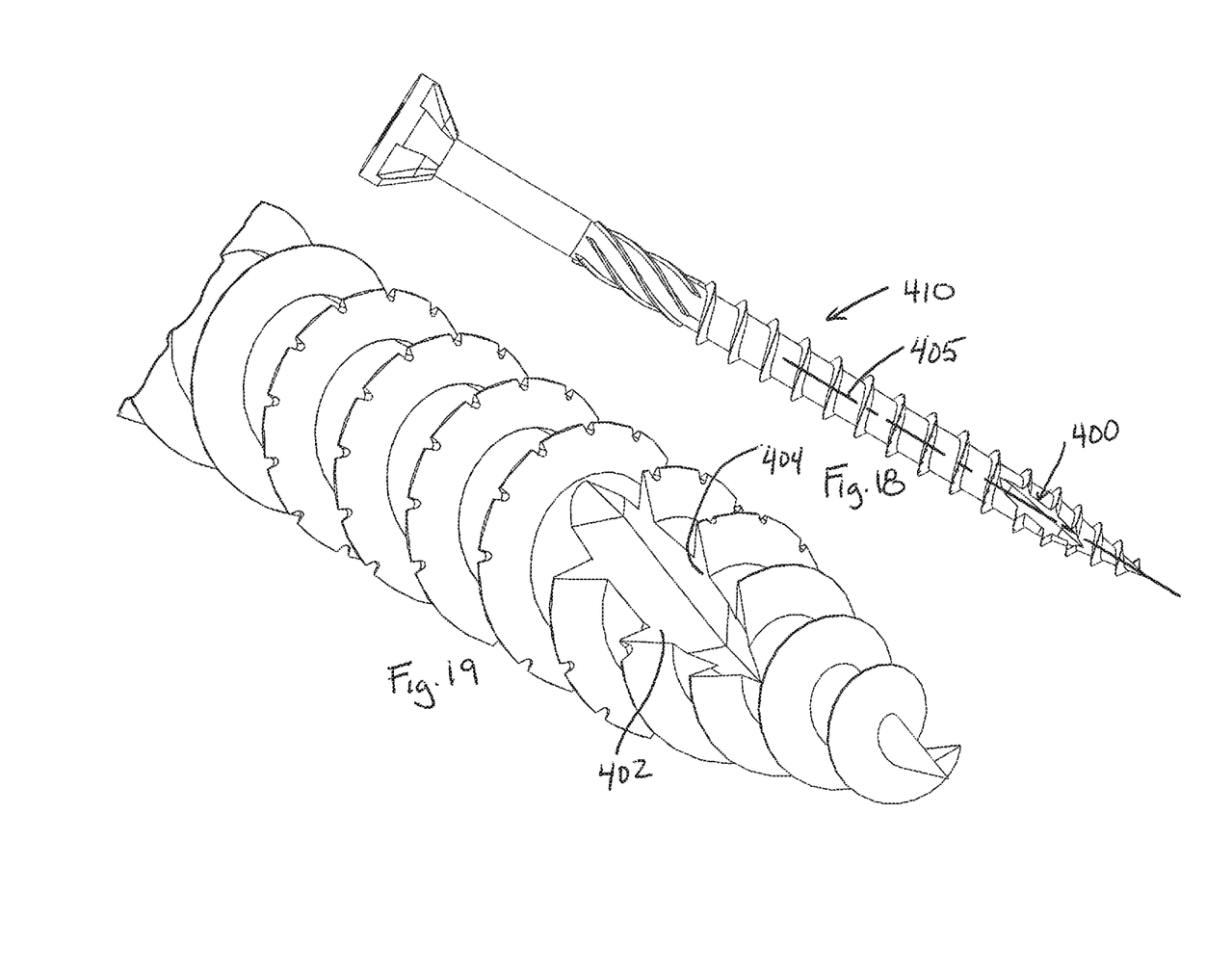
FIGS. 18-19 show another embodiment of a screw incorporating a skewed cut further away from the tip.

FIG. 18-19 show yet another embodiment of a screw 410. Screw 410 is similar in all respects to screw 10 described above, except that an axial cut 400 is provided toward the tip end of the screw. The cut 400 is angled or skewed relative to the axis 405 of the screw, begins on the tapered end of the screw spaced from the tip and ends on the main shank of the screw. The cut 400 is defined by sides 402 and 404 that intersect at an included angle of about ninety degrees. The cut 400 intersects three revolutions of the primary thread, creating three discontinuities in the primary thread.

Referring now to FIG. 20, an alternative nib arrangement is shown in which each nib 80' each nib terminates the axial location where the frustoconical part 70 meets the frustoconical part 72, and each nib 80' defines a radially outward step 81' at that axial location. A radial dimension of each step 81' may be between about fifteen percent and about thirty percent of a diameter D of the shank at the axial location where the frustoconical part 72 meets the shank 14 Angles $\alpha 2$, $\alpha 3$ and $\alpha 4$ may be similar to those described above for nibs 80.

It is to be clearly understood that the above description is intended by way of illustration and example only, is not intended to be taken by way of limitation, and that other changes and modifications are possible. For example, while certain relative dimensions have been provided by example above, variations are possible.

What is claimed is:

1. A screw, comprising:
  a head end, a shank and a tapered end,
  the head end including a tool engaging part, the head end located at one end of the shank and the tapered end located at an opposite end of the shank,
  wherein at least one thread is formed along the shank including:
    a primary thread that begins on the tapered end, extends onto the shank and terminates at a set location short of the head end, the primary thread being a right-hand thread and having a peripheral edge, at least a first helical portion of the peripheral edge includes a plurality of notch regions spaced apart from each other by respective notch-free regions, each notch region (i) extending helically through only between two-hundred and eighty circumferential degrees and three-hundred and twenty circumferential degrees and (ii) including a plurality of spaced notches formed in the peripheral edge, and each notch-free region is positioned along a portion of the peripheral edge that is between two notch regions and each notch-free region extending helically through only between about forty circumferential degrees and about eighty circumferential degrees and lacking any notches;
    wherein the notch free regions are distributed along the first helical portion such that a line sequentially intersecting the peripheral edge and traversing a mid-point of each of the notch free regions extends in a left-hand helical path.

2. The screw of claim 1 wherein the primary thread includes a second helical portion extending from the first helical portion to the set location, the second helical portion completely free of any notches.

3. The screw of claim 1 wherein the first helical portion runs from a location on or near the tapered end and substantially to the set location.

4. The screw of claim 1 wherein a set of right-hand spiral flute threads are located on the shank between the primary thread and the head end.

5. The screw of claim 1 wherein the head end includes a first frustoconical part tapering in a direction from the tool engaging part toward the shank at a first angle relative to a center axis of the screw, a second frustoconical part tapering from the first frustoconical part to the shank at a second angle relative to the center axis, at least the first frustoconical part including a plurality of outwardly protruding spaced apart nibs, each nib having a first end proximate the tool engaging part, each nib extending toward the shank to a second end, each nib having opposite sides and a joining surface that is a segment of a common frustoconical shape, the frustoconical shape defining a third angle relative to the axis, the third angle being less than the first angle but greater than the second angle.

6. The screw of claim 5 wherein each nib terminates at a first axial location where the first frustoconical part meets the second frustoconical part, each nib defining a radially outward step at the first axial location, wherein a radial dimension of each step is between about fifteen percent and about thirty percent of a diameter of the shank at a second axial location where the second frustoconical part meets the shank.

7. The screw of claim 5 wherein each nib extends onto the second frustoconical part and terminates at an axial location where the second frustoconical part meets the shank, each nib defining a radially outward step at the axial location.

8. The screw of claim 7 wherein a radial dimension of each step is between about fifteen percent and about thirty percent of a diameter of the shank at the axial location.

9. The screw of claim 7 wherein the opposite sides of each nib diverge from each other at a first diverging angle along the second frustoconical part when moving from the shank toward the first frustoconical part, and the opposite sides of each nib diverge from each other at a second diverging angle along the first frustoconical part when moving from the second frustoconical part toward the tool engaging part, wherein the second diverging angle is at least twenty degrees greater than the first diverging angle.

10. The screw of claim 6 wherein between three and six spaced apart nibs are included on the head.

11. The screw of claim 1 wherein the primary thread is asymmetric.

12. The screw of claim 11 wherein a leading flank angle of the primary thread is in the range of about 25 to about 31 degrees and a trailing flank angle of the primary thread is in the range of about 12 to about 19 degrees.

13. The screw of claim 1, further comprising a cut that creates multiple discontinuities in the primary thread.

14. A screw, comprising:
a head end, a shank and a tapered end,
the head end including a tool engaging part, the head end located at one end of the shank and the tapered end located at an opposite end of the shank,
wherein at least one thread is formed along the shank including:
a primary thread that begins on the tapered end, extends onto the shank and terminates at a set location short of the head end, the primary thread being a right-hand thread and having a peripheral edge, at least a first helical portion of the peripheral edge includes a plurality of notch regions spaced apart from each other by respective notch-free regions, each notch region extending helically and including a plurality of spaced notches formed in the peripheral edge where a center-to-center circumferential spacing between the notches is no more than about thirty-five circumferential degrees, and each notch-free region is positioned along a portion of the peripheral edge that is between two notch regions and each notch-free region extends helically through at least about forty circumferential degrees;
wherein the notch free regions are distributed along the first helical portion such that a line sequentially intersecting the peripheral edge and traversing a mid-point of each of the notch free regions extends in a left-hand helical path.

15. The screw of claim 14 wherein each notch region extends helically through between two-hundred and eighty circumferential degrees and three-hundred and twenty circumferential degrees and each notch-free region extends helically through between about forty circumferential degrees and about eighty circumferential degrees.

16. The screw of claim 14 wherein the head end includes a first frustoconical part tapering in a direction from the tool engaging part toward the shank at a first angle relative to a center axis of the screw, a second frustoconical part tapering from the first frustoconical part to the shank at a second angle relative to the center axis, at least the first frustoconical part including a plurality of outwardly protruding spaced apart nibs, each nib having a first end proximate the tool engaging part, each nib extending toward the shank to a second end, each nib having opposite sides and a joining surface that is a segment of a common frustoconical shape, the frustoconical shape defining a third angle relative to the center axis, the third angle being less than the first angle but greater than the second angle.

17. The screw of claim 14 wherein the primary thread includes a second helical portion extending from the first helical portion to the set location, the second helical portion completely free of any notches.

18. The screw of claim 14 wherein the first helical portion runs from a location on or near the tapered end and substantially to the set location.

19. A screw, comprising:
a head end, a shank and a tapered end,
the head end including a tool engaging part, the head end located at one end of the shank and the tapered end located at an opposite end of the shank,
at least one helical thread is formed along the shank;
wherein the head end includes a first frustoconical part tapering in a direction from the tool engaging part toward the shank at a first angle relative to a center axis of the screw, a second frustoconical part tapering from the first frustoconical part to the shank at a second angle relative to the center axis, at least the first frustoconical part including a plurality of outwardly protruding spaced apart nibs, each nib having a first end toward the tool engaging part and extending toward the shank to a second end, each nib having opposite sides and a joining surface that is a segment of a common frustoconical shape, the frustoconical shape defining a third angle relative to the center axis, the third angle being less than the first angle but greater than the second angle.

20. The screw of claim 19 wherein each nib extends onto the second frustoconical part and terminates at an axial location where the second frustoconical part meets the shank, each nib defining a radially outward step at the axial location.

21. The screw of claim 20 wherein a radial dimension of each step is between about fifteen percent and about thirty percent of a diameter of the shank at the axial location.

22. The screw of claim 20 wherein the opposite sides of each nib diverge from each other at a first diverging angle along the second frustoconical part when moving from the shank toward the first frustoconical part, and the opposite sides of each nib diverge from each other at a second diverging angle along the first frustoconical part when moving from the second frustoconical part toward the tool engaging part, wherein the second diverging angle is at least twenty degrees greater than the first diverging angle.

23. The screw of claim 19 wherein each nib terminates at a first axial location where the first frustoconical part meets the second frustoconical part, each nib defining a radially outward step at the first axial location, wherein a radial dimension of each step is between about fifteen percent and about thirty percent of a diameter of the shank at a second axial location where the second frustoconical part meets the shank.

24. A screw, comprising:
a head at one end, a point at an opposite end and a shank extending between the head and the point,
at least one helical thread is formed along the shank;
wherein the head includes a frustoconical part tapering in a direction from the face of the head toward the shank at a first angle relative to a center axis of the screw, an underside of the head includes a plurality of outwardly protruding spaced apart nibs along the frustoconical part,
each nib having a first end toward the face, each nib extending both axially and radially toward the shank to a second end, each nib having opposite sides and a joining surface that is a segment of a common frustoconical shape, the frustoconical shape defining a second angle relative to the center axis, the second angle less than the first angle;
wherein the opposite sides of each nib diverge from each other at a first diverging angle along one section and at a second diverging angle along another section.

* * * * *

UNITED STATES PATENT AND TRADEMARK OFFICE
CERTIFICATE OF CORRECTION

PATENT NO. : 10,436,238 B2
APPLICATION NO. : 15/454119
DATED : October 8, 2019
INVENTOR(S) : Michael K. Falkenstein and Farhad Lajewardi It is certified that error appears in the above-identified patent and that said Letters Patent is hereby corrected as shown below:

In the Claims

Column 7, Line 32, Claim 10 reads:
"10. The screw of claim 6 wherein between three and six"
Should read:
--10. The screw of claim 5 wherein between three and six--

Signed and Sealed this
Tenth Day of December, 2019

Andrei Iancu
*Director of the United States Patent and Trademark Office*